United States Patent [19]

Demus et al.

[11] Patent Number: 4,767,565

[45] Date of Patent: Aug. 30, 1988

[54] SWITCHING TIME SHORTENING DOPANTS FOR LIQUID CRYSTALLINE MIXTURES

[75] Inventors: Dietrich Demus, Halle; Anton Hauser, Wettin; Michael Keil, Etzdorf, all of German Democratic Rep.

[73] Assignee: VEB Werk fuer Fernsehelektronik im VEB Kombinat Mikroelektronik, Berlin, Fed. Rep. of Germany

[21] Appl. No.: 106,981

[22] Filed: Oct. 5, 1987

Related U.S. Application Data

[63] Continuation of Ser. No. 810,467, Dec. 18, 1985, abandoned.

[30] Foreign Application Priority Data

Jan. 28, 1985 [DD] German Democratic Rep. ... 272798

[51] Int. Cl.$^4$ ............... C09K 19/54; G02F 1/13
[52] U.S. Cl. ............... 252/299.5; 350/350 R
[58] Field of Search ............... 252/299.2, 299.3, 299.4, 252/299.5; 350/350 R

[56] References Cited

U.S. PATENT DOCUMENTS

| | | | |
|---|---|---|---|
| 4,180,475 | 12/1979 | Schadt et al. | 252/299.5 |
| 4,198,130 | 4/1980 | Boller et al. | 252/299.5 |
| 4,469,452 | 9/1984 | Sharpless et al. | 252/299.5 |

*Primary Examiner*—Teddy S. Gron
*Assistant Examiner*—J. E. Thomas
*Attorney, Agent, or Firm*—Jordan and Hamburg

[57] ABSTRACT

Compounds of the general formula $C_mH_{2m+2}$, wherein m signifies 10 to 35, are added to liquid crystalline nematic substances to shorten the switching time of the substances when used in opto-electronic components.

5 Claims, No Drawings

SWITCHING TIME SHORTENING DOPANTS FOR LIQUID CRYSTALLINE MIXTURES

This application is a continuation of application Ser. No. 810,467, filed Dec. 18, 1985, now abandoned.

BACKGROUND OF THE INVENTION AND RELATED ART STATEMENT

The invention relates to switching-time-shortening dopants for nematic mixtures, which can be utilized in opto-electronic components (displays) for the electronically controlled modulation of transmitted or reflected light, as well as for the rendition of numbers, symbols and images.

Nematic crystalline liquids can be used in opto-electronic components (displays) G. Meiner, E. Sackmann, J. G. Grabmaier: Applications of Liquid Crystals, Berlin, New York, London 1975.

In order to be suitable for displays, liquid crystals have to fulfill a multitude of requirements, among which there are also included very short switching times which, among other, can also be attained by low viscosities. As viscosity-reducing admixtures dialkyl-biphenyl derivatives have become known up to now. J. Krause, R. Steinstraesser, L. Pohl, F. del Pino, G. Weber, DE-OS No. 2,548,360. The disadvantages in the utilization of the biphenyl derivatives are the lowering of the clarification points which have to be increased again by adding other substances. Furthermore, the admixture of approximately 25 weight parts of biphenyl derivatives is required in order to reduce the viscosity by one half, whereby the clarification point is lowered by almost 20° C.

The object of the invention is to provide liquid crystalline mixtures of short switching times for opto-electronic components.

The object of the invention are substances which reduce the rotational viscosity of nematic crystalline liquids and thus lead to fast switching times and which, furthermore, excell in a high effectiveness and are simple to produce.

SUMMARY OF THE INVENTION

It has been found that by the admixture of 0.5 to 30% of one or several compounds of the general formula $$C_mH_{2m+2} \quad (I)$$

wherein m=10 to 35, the electro-optical switching time of liquid crystalline nematic substances is considerably reduced.

DETAILED DESCRIPTION OF PREFERRED EMBODIMENTS

Hereonafter, the invention will be explained in greater detail by means of examples.

EXAMPLE 1

The subsequently mentioned mixtures are used in an opto-electronic cell of the Schadt-Helfrich type (twisted nematic structure, TNP cell). The cell consists of two glass plates which, by means of distance spacers, are fixed at a distance of 7 to 25 μm and which are provided on the inside with stannic dioxide. Furthermore, the inside is pre-treated according to conventional methods such that the liquid crystal located between the plates orients itself parallel to the plates, the preferred direction on the two plates, however, including an angle of 90°, so that a twisted nematic structure results, which is arranged between the crossed or parallel polarizers.

By turning the electrical field on and off, strong changes of the light-transmitting capability of the cell are attained.

Into the Schadt-Helfrich cell mixtures of the following compositions are introduced:
Basic component:
  4-n-pentyl-cyclohexanecarboxylic acid-4'-cyanophenylester
Dopant:
  n-eicosane (n-$C_{20}H_{42}$)

The characteristics of mixtures of the basic component with the dopant are summarized in the following table (test frequency 500 Hz, test temperature 42.5° C., thickness of layer 10 μm).

The symbols in the tables have the following meanings:
$U_o$—voltage for an intensity change of 10%
$t_{E50}$—time from applying the electrical field until an intensity change of 50% is attained
$t_{A50}$—time from turning off the electrical field until an intensity change of 50% is attained
γ—rotational viscosity
υNI—clarification temperature
υKN—transformation temperature, crystalline-nematic
$\Delta E_E$—activation energy for the switching-on times

| mol % Dopant | 0 | 2 | 8 | 10 |
|---|---|---|---|---|
| $U_o$/V | 1.10 | 1.12 | 1.17 | 1.18 |
| $t_{E50}(U = 2U_o)$/ms | 169 | 122 | 69 | 43 |
| $t_{E50}(U = 5V)$/ms | 26 | 19 | 12 | 9 |
| $t_{A50}$/ms | 75 | 47 | 19 | 11 |
| γ/cP | 82 | 41 | 15 | 11 |
| υNI/°C. | 79 | 75–76 | 65–68 | 61–65 |
| υKN/°C. | 47 | 46.5 | 46 | 45.5 |

The electro-optical Schadt-Helfrich type cell (TNP-cell) described in Example 1 is operated in the further Examples 2 to 7 with basic substance mixtures, to each of which 4% of a compound in the general formula (I) has been added. (Measurement of the switching times at twice the threshold voltage $U_o$)

In the examples 2-6 the basic substance mixture A consists of

| Mol % | |
|---|---|
| 21.2 | 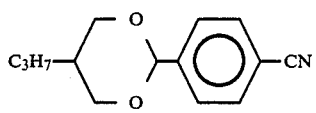 |
| 28.2 | 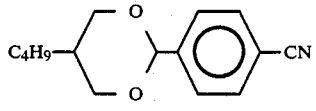 |
| 21.2 | 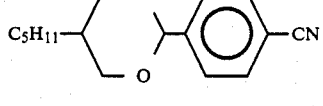 |

-continued

| Mol % | Structure |
|---|---|
| 8.1 | $C_6H_{13}O$—⟨phenyl⟩—⟨pyrimidine (N,N)⟩—$C_6H_{13}$ |
| 3.7 | $C_9H_{19}O$—⟨phenyl⟩—⟨pyrimidine (N,N)⟩—$C_6H_{13}$ |
| 12.0 | $C_4H_9$—⟨cyclohexyl-H⟩—COO—⟨phenyl⟩—$OC_2H_5$ |
| 5.6 | $C_4H_9$—⟨cyclohexyl-H⟩—COO—⟨phenyl⟩—$OC_6H_{13}$ |

EXAMPLE 2

| Mixture A $v_{NI} = 46°$ C., $\Delta E_E = 2.29$ kJMol$^{-1}$ | | | Mixture A + 4 weight % $C_{24}H_{50}$ $v_{NI} = 44°$ C., $\Delta E_E = 27.7$ kJMol$^{-1}$ | | |
|---|---|---|---|---|---|
| $v/°C.$ | $U_o/V$ | $t_{E50}/ms$ | $t_{A50}/ms$ | $U_o/V$ | $t_{E50}/ms$ | $t_{A50}/ms$ |
| 20 | 1.34 | 156 | 68 | 1.24 | 127 | 51 |
| 25 | 1.23 | 133 | 50 | 1.11 | 86 | 44 |
| 30 | 1.17 | 106 | 41 | 1.01 | 79 | 35 |
| 35 | 1.06 | 90 | 36 | 0.93 | 55 | 30 |
| 40 | 0.98 | 80 | 32 | 0.87 | 48 | 27 |
| 45 | 0.93 | 72 | 31 | 0.80 | 45 | 24 |
| 50 | 0.88 | 67 | 30 | 0.75 | 41 | 22 |

| Mixture A + 4 weight % $C_{20}H_{42}$ $v_{NI} = 44°$ C.; $\Delta E_E = 10.7$ kJmol$^{-1}$ | | | |
|---|---|---|---|
| $v/°C.$ | $U_o/V$ | $t_{E50}/ms$ | $t_{A50}/ms$ |
| 20 | 1.34 | 142 | 50 |
| 25 | 1.19 | 121 | 44 |
| 30 | 1.05 | 114 | 42 |
| 35 | 0.95 | 103 | 38 |
| 40 | 0.85 | 100 | 35 |
| 45 | 0.77 | 96 | 32 |
| 50 | 0.69 | 92 | 29 |

EXAMPLE 3

Mixture A + 10 mol %

$C_5H_{11}$—⟨phenyl⟩—COO—⟨phenyl⟩—⟨pyrimidine (N,N)⟩—$C_6H_{13}$ (B)

| Mixture A and 10 mol % B $v_{NI} = 56°$ C.; $\Delta E_E = 10.4$ kJmol$^{-1}$ | | | |
|---|---|---|---|
| $v/°C.$ | $U_o/V$ | $t_{E50}/ms$ | $t_{A50}/ms$ |
| 20 | 1.30 | 140 | 59 |
| 25 | 1.22 | 130 | 42 |
| 30 | 1.15 | 107 | 34 |
| 35 | 1.09 | 98 | 31 |
| 40 | 1.05 | 89 | 28 |
| 45 | 0.97 | 82 | 26 |
| 50 | 0.92 | 74 | 25 |

Mixture A + 10 mol % B + 4 weight % $C_{24}H_{50}$
$v_{NI} = 47°$ C.; $\Delta E_E = 9.4$ kJmol$^{-1}$

| $v/°C.$ | $U_o/V$ | $t_{E50}/ms$ | $t_{A50}/ms$ |
|---|---|---|---|
| 20 | 1.23 | 118 | 43 |
| 25 | 1.17 | 110 | 36 |
| 30 | 1.04 | 103 | 31 |
| 35 | 0.98 | 97 | 27 |
| 40 | 0.94 | 92 | 24 |
| 45 | 0.89 | 87 | 21 |
| 50 | 0.85 | 85 | 18 |

EXAMPLE 4

Mixture A + 10 mol % B + 10 mol % C $C_6H_{13}$—⟨phenyl⟩—CH(—O—)(—O—)CH—⟨phenyl⟩—CN (C)

| Mixture A + 10 mol % B + 10 mol % C $v_{NI} = 67°$ C.: $\Delta E_E = 10.0$ kJmol$^{-1}$ | | | Mixture A + 10 mol % B + 10 mol % C + 4 weight % $C_{24}H_{50}$ $v_{NI} = 60°$ C.: $\Delta E_E = 7.2$ kJmol$^{-1}$ | | |
|---|---|---|---|---|---|
| $v/°C.$ | $U_o/V$ | $t_{E50}/ms$ | $t_{A50}/ms$ | $U_o/V$ | $t_{E50}/ms$ | $t_{A50}/ms$ |
| 20 | 2.01 | 168 | 116 | 2.14 | 165 | 122 |
| 25 | 1.65 | 162 | 98 | 1.73 | 160 | 97 |
| 30 | 1.52 | 155 | 86 | 1.49 | 151 | 77 |
| 35 | 1.43 | 146 | 75 | 1.33 | 142 | 65 |
| 40 | 1.33 | 138 | 67 | 1.20 | 135 | 55 |
| 45 | 1.23 | 130 | 61 | 1.09 | 125 | 46 |
| 50 | 1.16 | 122 | 55 | 0.98 | 100 | 38 |

EXAMPLE 5

Mixture A + 10 mol % B + 10 mol % D $C_6H_{13}$—⟨cyclohexyl-H⟩—CH(—O—)(—O—)CH—⟨phenyl⟩—CN (D)

| Mixture A + 10 mol % B + 10 mol % D $v_{NI} = 74°$ C.; $\Delta E_E = 19.4$ kJmol$^{-1}$ | | | Mixture A + 10 mol % B + 10 mol % D + 4 weight % $C_{24}H_{50}$ $v_{NI} = 65°$ C.; $\Delta E_E = 16.6$ kJmol$^{-1}$ | | |
|---|---|---|---|---|---|
| $v/°C.$ | $U_o/V$ | $t_{E50}/ms$ | $t_{A50}/ms$ | $U_o/V$ | $t_{E50}/ms$ | $t_{A50}/ms$ |
| 25 | | | | 1.68 | 99 | 50 |
| 30 | 1.60 | 115 | 64 | 1.50 | 83 | 38 |
| 35 | 1.49 | 101 | 51 | 1.40 | 72 | 30 |
| 40 | 1.42 | 90 | 41 | 1.32 | 66 | 24 |
| 45 | 1.35 | 86 | 33 | 1.25 | 60 | 21 |
| 50 | 1.29 | 71 | 28 | 1.18 | 55 | 20 |

EXAMPLE 6

| Mixture A + 10 mol % B + 10 mol % C + 10 mol % D $v_{NI} = 77°$ C.; $\Delta E_E = 12.5$ kJmol$^{-1}$ | | | Mixture A + 10 mol % B + C + 10 mol % D + 4 weight % $C_{24}H_{50}$ $v_{NI} = 65°$ C.; $\Delta E_E = 10.8$ kJmol$^{-1}$ | | |
|---|---|---|---|---|---|
| $v/°C.$ | $U_o/V$ | $t_{E50}/ms$ | $t_{A50}/ms$ | $U_o/V$ | $t_{E50}/ms$ | $t_{A50}/ms$ |
| 20 | 2.27 | 125 | 80 | 1.78 | 72 | 43 |
| 25 | 1.99 | 116 | 69 | 1.63 | 64 | 37 |
| 30 | 1.78 | 108 | 59 | 1.50 | 59 | 32 |
| 35 | 1.58 | 101 | 51 | 1.38 | 55 | 28 |
| 40 | 1.46 | 94 | 42 | 1.27 | 52 | 26 |

| Mixture A + 10 mol % B + 10 mol % C + 10 mol % D | | | Mixture A + 10 mol % B + 10 mol % C + 10 mol % D + 4 weight % $C_{24}H_{50}$ $\nu_{NI} = 65°$ C.; $\Delta E_E = 10.8$ kJmol$^{-1}$ | | |
|---|---|---|---|---|---|
| Mixture A + 10 mol % B + 10 mol % C + 10 mol % D $\nu_{NI} = 77°$ C.; $\Delta E_E = 12.5$ kJmol$^{-1}$ | | | | | |
| $\nu$/°C. | $U_o$/V | $t_{E50}$/ms | $t_{A50}$/ms | $U_o$/V | $t_{E50}$/ms | $t_{A50}$/ms |
| 45 | 1.36 | 87 | 36 | 1.20 | 48 | 23 |
| 50 | 1.28 | 82 | 31 | 1.12 | 46 | 21 |

EXAMPLE 7

In example 7 the basic substance mixture consists of a biphenyl mixture E 5 (BDH)

| Mixture E 5 $\nu_{NI} = 50°$ C.; $\Delta E_E = 38.1$ kJmol$^{-1}$ | | | Mixture E 5 + 4 weight % $C_{20}H_{42}$ $\nu_{NI} = 48°$ C.; $\Delta E_E = 26.1$ kJmol$^{-1}$ | | |
|---|---|---|---|---|---|
| $\nu$/°C. | $U_o$/V | $t_{E50}$/ms | $t_{A50}$/ms | $U_o$/V | $t_{E50}$/ms | $t_{A50}$/ms |
| 20 | 1.63 | 250 | 126 | 1.44 | 200 | 88 |
| 25 | 1.46 | 206 | 92 | 1.38 | 170 | 75 |
| 30 | 1.30 | 167 | 73 | 1.34 | 150 | 67 |
| 35 | 1.18 | 136 | 55 | 1.30 | 136 | 61 |
| 40 | 1.07 | 99 | 48 | 1.26 | 126 | 55 |
| 45 | 0.98 | 80 | 45 | 1.21 | 117 | 49 |
| 50 | 0.90 | 62 | 41 | 1.17 | 105 | 45 |

| Mixture E 5 + 4 weight % $C_{24}H_{50}$ $\nu_{NI} = 49°$ C.; $\Delta E_E = 23.8$ kJmol$^{-1}$ | | | |
|---|---|---|---|
| $\nu$/°C. | $U_o$/V | $t_{E50}$/ms | $t_{A50}$/ms |
| 20 | 1.57 | 145 | 54 |
| 25 | 1.40 | 100 | 47 |
| 30 | 1.29 | 75 | 36 |
| 35 | 1.23 | 66 | 33 |
| 40 | 1.17 | 59 | 30 |
| 45 | 1.12 | 55 | 27 |
| 50 | 1.07 | 52 | 26 |

What we claim is:

1. A composition comprising at least one nematic liquid crystalline compound and at least one dopant compound of the general formula $C_mH_{2m+2}$, in which m is an integer from 20 to 24, in an amount sufficient to reduce the rotational viscosity of the nematic liquid crystalline compound.

2. A composition according to claim 1, in which the proportion of the dopant compound is 0.5 to 4% by weight.

3. A composition according to claim 1, in which the proportion of the dopant compound is up to 10 mol %.

4. A composition according to claim 1, wherein the dopant compound comprises $C_{20}H_{42}$.

5. A composition according to claim 1, wherein the dopant compound comprises $C_{24}H_{50}$.

* * * * *